Feb. 12, 1952  N. L. OATES  2,585,267
CONVEYING APPARATUS FOR BEHEADED FISH
Filed Feb. 2, 1948  5 Sheets-Sheet 1

INVENTOR.
NORFORD L. OATES
BY Reynolds Beach
ATTORNEYS

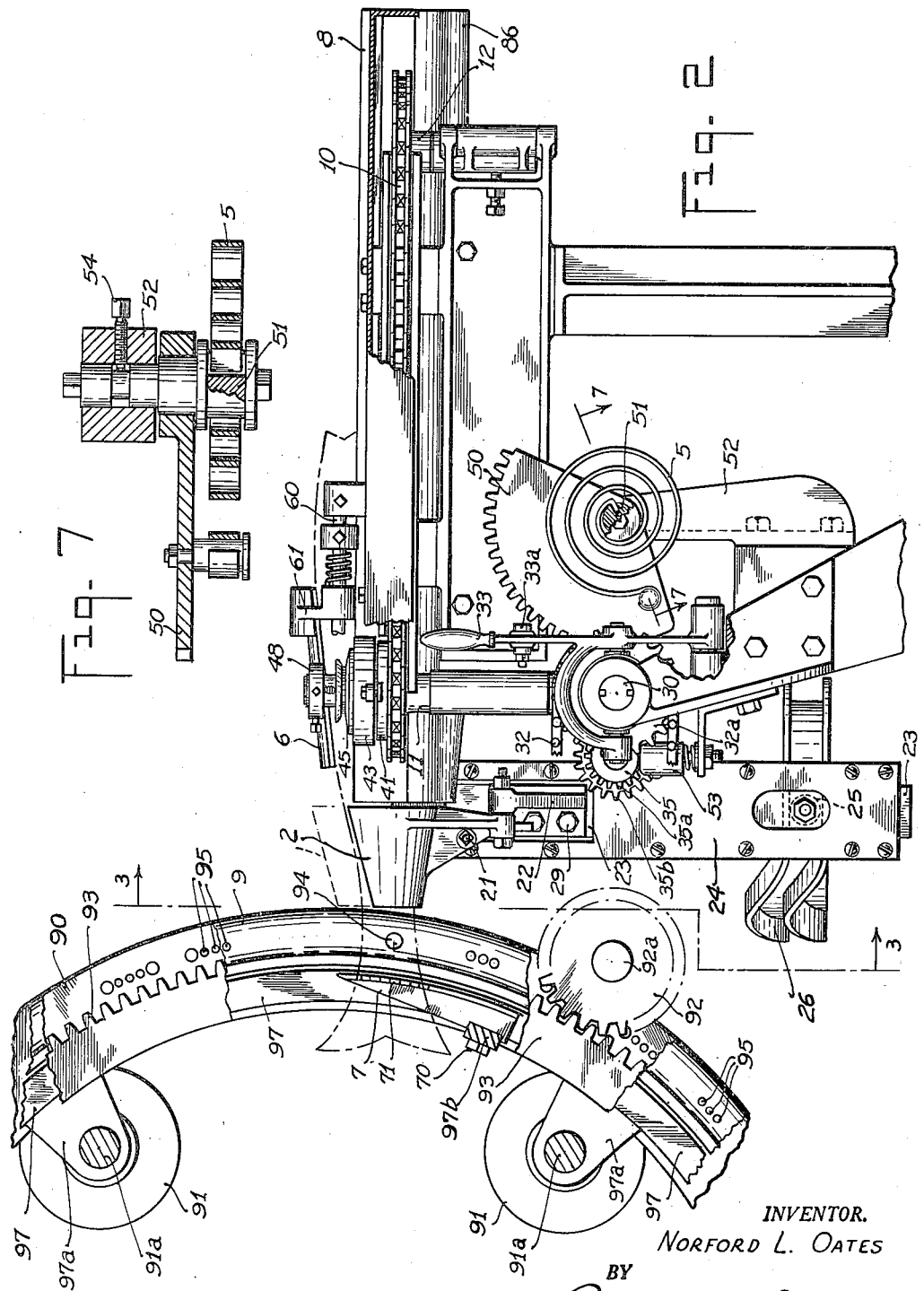

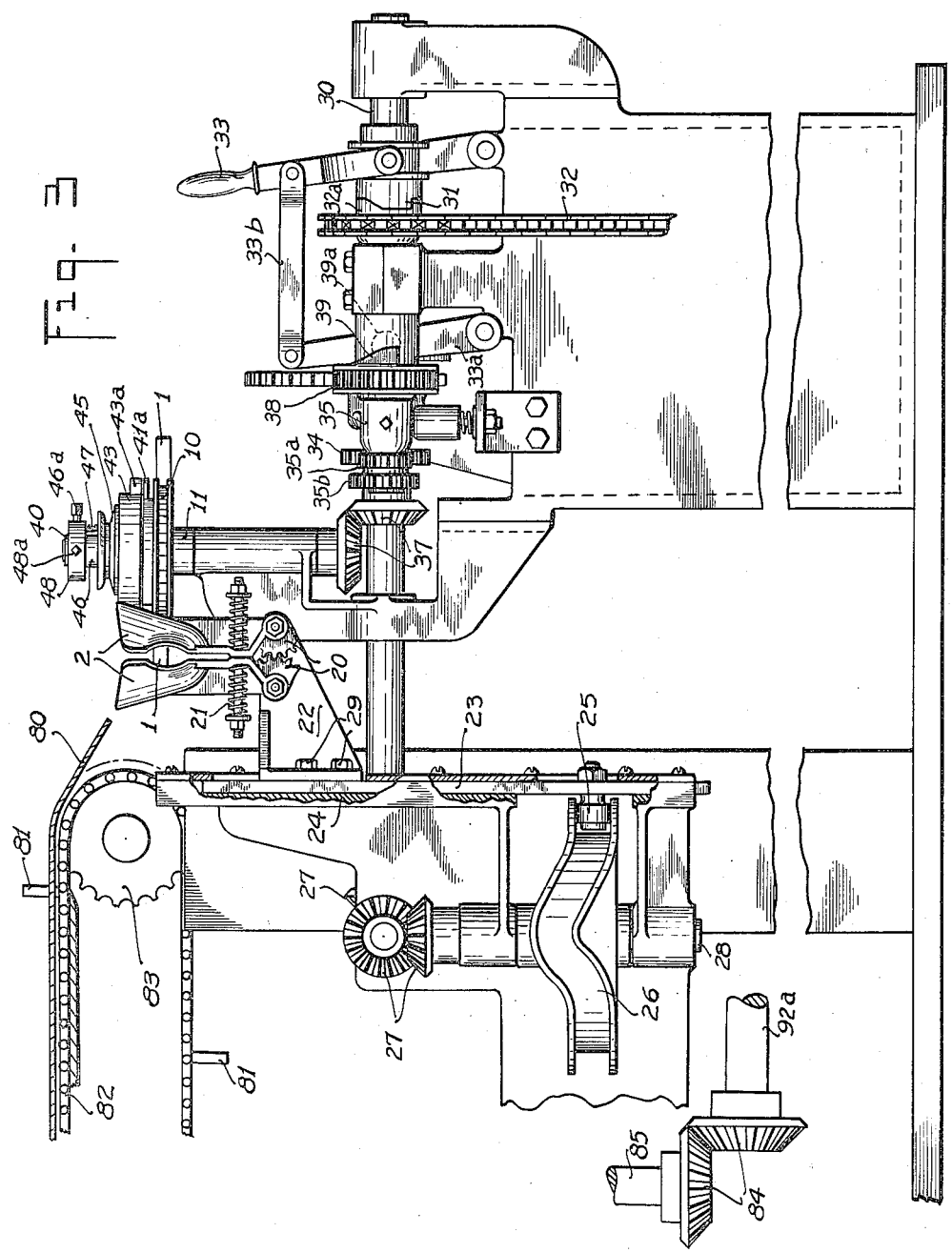

Feb. 12, 1952 N. L. OATES 2,585,267
CONVEYING APPARATUS FOR BEHEADED FISH
Filed Feb. 2, 1948 5 Sheets-Sheet 4
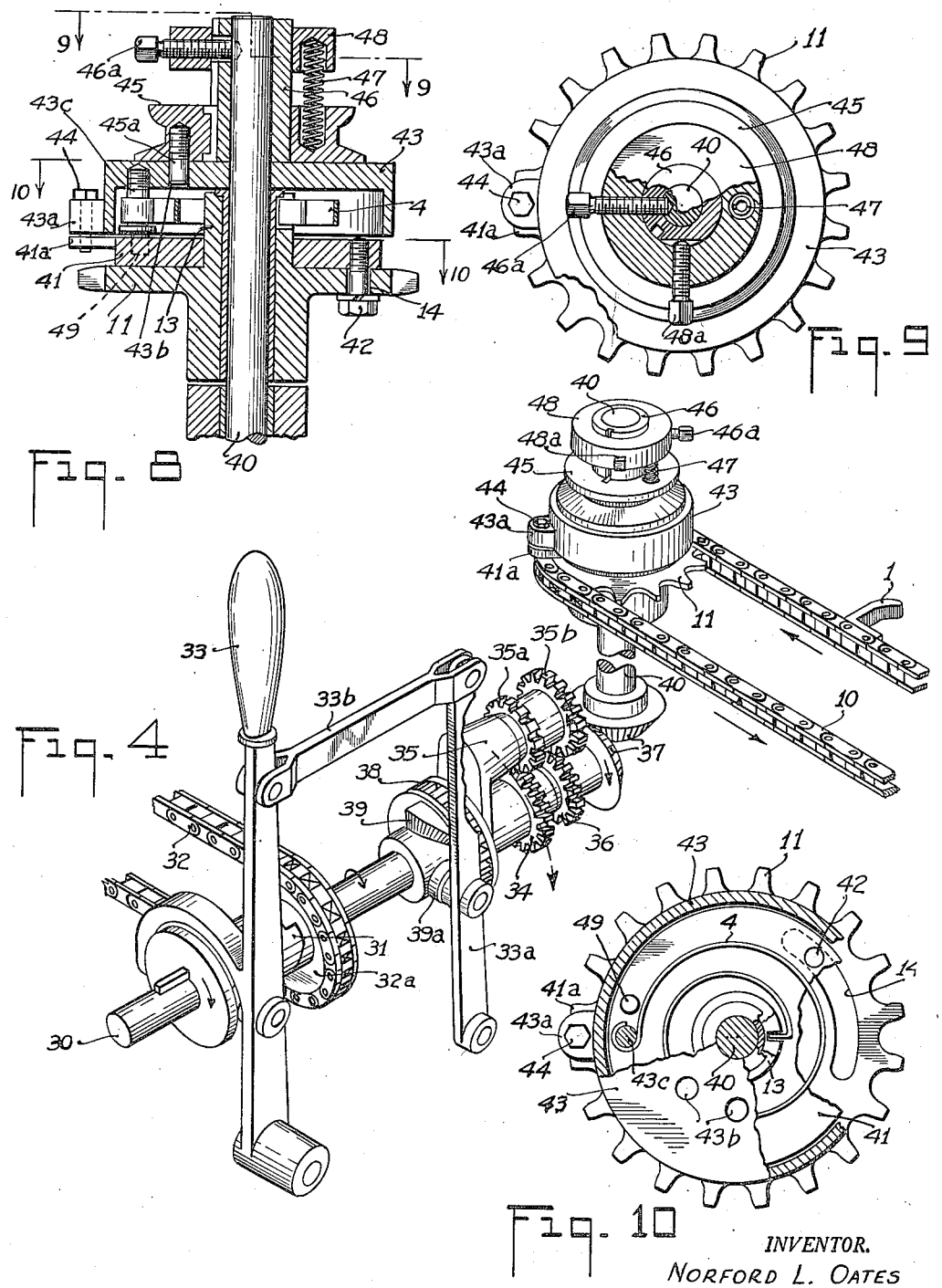
INVENTOR.
NORFORD L. OATES
BY
Reynolds & Beach
ATTORNEYS

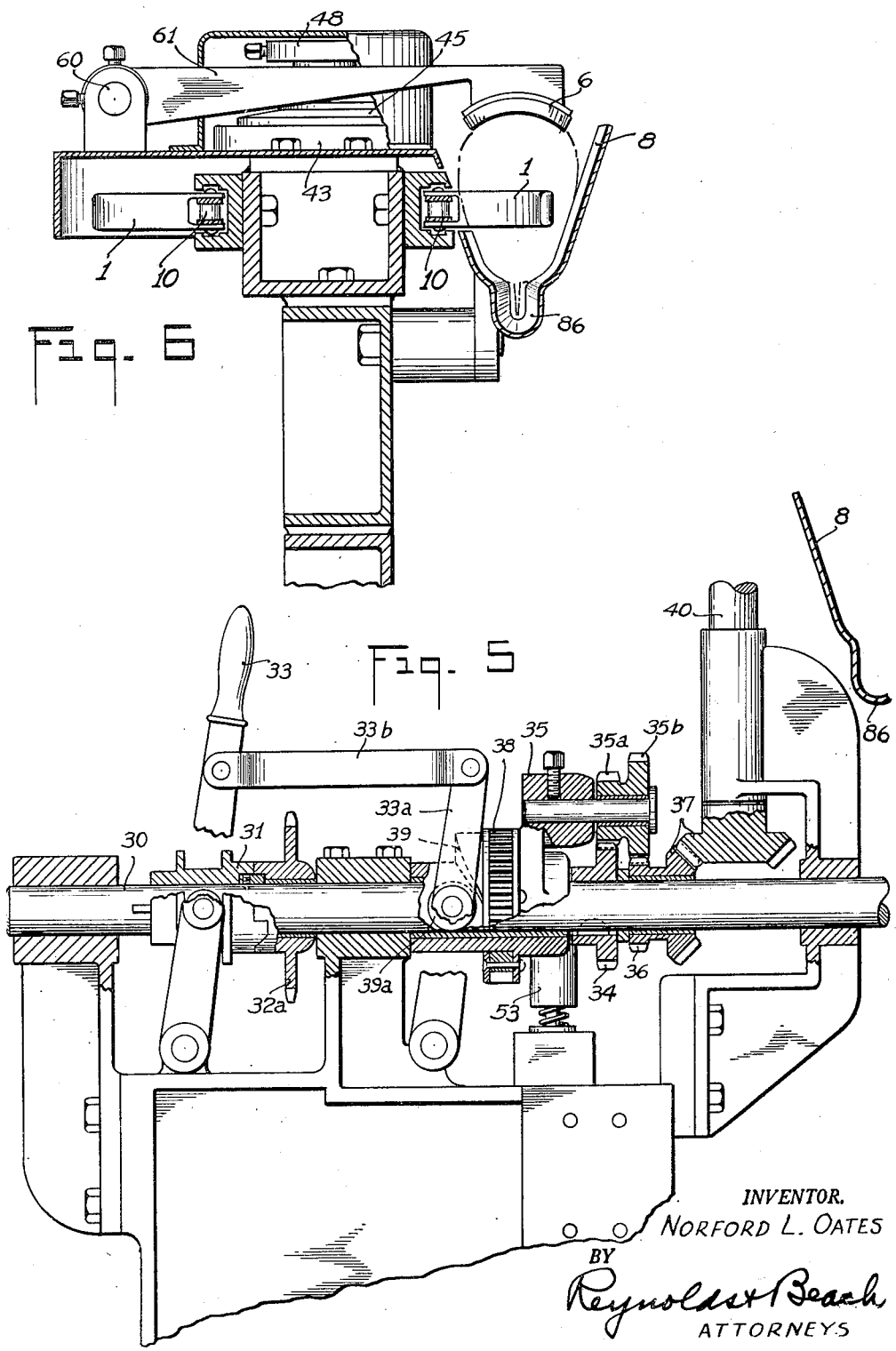

Patented Feb. 12, 1952

2,585,267

UNITED STATES PATENT OFFICE 2,585,267

CONVEYING APPARATUS FOR BEHEADED FISH

Norford L. Oates, Seattle, Wash., assignor to Smith Cannery Machines Company, Seattle, Wash., a corporation of Washington Application February 2, 1948, Serial No. 5,817

31 Claims. (Cl. 17—3)

In the preparation of salmon for canning successive individual fish are disposed upon a feed table back first, heads all directed to the same side, and extending transversely of the direction of feed, and, so disposed, each is advanced therealong in close succession and at a fairly rapid rate of advance by a positive drive means synchronized with a beheading knife which beheads the fish as it passes the beheading point. Before beheading each is pulled towards its head end to align the pectoral girdle with the beheading point. Each beheaded fish is promptly dropped belly-up into a trough, which guides it for tailward movement, and delivers it, tail first, to a fish cleaning machine with which the feed table and beheading knife are synchronized, of which the best known type is that sold under the trade-mark Iron Chink. Therein it is engaged and picked up first by its tail and then along its back, to lie circumferentially disposed upon a rotative upright bull ring, and as it advances the fins are removed, it is slit open, and the entrails are cleaned out. It must be accurately and properly held to the bull ring, belly outermost and tail foremost, as it moves circumferentially with the bull ring. To do this it is pinned at spaced points along its back by positioning pins in groups which are long enough to receive and hold as large a fish as is ordinarily expected to be cleaned. These groups of positioning pins are intended to engage each successive fish at a particular point in relation to its tail, and unless the fish is thus accurately positioned, or unless all the positioning pins engage it truly and accurately, trouble is likely to result. The fish may be damaged and its monetary value lost, or the entire machinery may become jammed, or the cleaning may not be properly performed and the pack might be downgraded.

While the upright bull ring is accurately synchronized with the horizontal header table, it does not follow that the fish after being beheaded will necessarily arrive in correct synchronism at the pick-up point for engagement by the bull ring's positioning means. At least two factors have operated to disturb such synchronism at this point. For one, those fish-advancing means by which the fish are individually advanced flatwise of and disposed transversely upon the header table are not arranged to advance the fish lengthwise to and then circularly about the path it follows through the fish cleaning machine; the fish must change its direction and its attitude, and must greatly increase its speed of movement in the tailward sense, hence the header table feed means must disengage each fish after it is beheaded and before it arrives at the pick-up point to be engaged by the bull ring. For an interval the fish has heretofore laid in or moved along the trough, freed of positive control, while it changed direction and again moved in another new direction and in a changed attitude, and because of differences between individual fish, or between the attitude or positioning of successive fish when thus released and when moving in the trough, some will move more freely or more accurately than others, and thus synchronization may be destroyed. A second factor is found in the difference in length of individual fish, and in the relationship of their varying lengths to their uniform spacing upon the feed table. All are accurately aligned by their pectoral girdle, just behind the head, at the time they pass the beheading point, but almost immediately thereafter must move rapidly tailward to the pick-up point, and a point in the vicinity of the tail of each fish must be rather accurately located in time for pick-up. It is obvious that a long fish requires less movement tailward from beheading position to pick-up position than does a short fish, and that since the interval permitted for such movement is necessarily short, being only the time required for an eight-inch advance of the header table feed means, any impositive or nonsynchronized force (gravity, for instance) intended to accomplish such tailward movement will not infrequently fail to do so in time. The mere provision of means to positively advance fish along the trough will not necessarily insure the desired synchronism. Inded some fish may be so long as to overlap the bull ring position of a following fish, which, if a second fish must follow at a definite interval, regardless, will cause a jam, and so the provision of a yieldable drive for such fish-advancing means will not alone solve the problem, for if an overlarge fish may cause a stretch-out of the trough interval, the intended synchronism between header table and bull ring is destroyed.

In the past a speed of operation of fifty or sixty fish a minute was deemed ample, nor was it considered uneconomical to station an operator at the trough, who, by hand, would move the fish along the trough into position for engagement by the bull ring as the latter moves upwardly past the fish at the pick-up point, and who would see to it that each fish was correctly pinned upon the bull ring. It has also been attempted to cause the fish to slide by gravity along the trough into proper pick-up position for engagement by the bull ring, but this did not operate with entire satisfaction, for some fish will slide more readily than others, and some are long and some are short, and the long ones might arrive too soon at the pick-up point, the short ones too late.

With the very greatly increased speed of operation now employed, in the neighborhood of 110 to 120 or 130 fish a minute, and with a speed of 150 fish a minute possible, even were it economically feasible to station an operator at this point, it would be physically impossible for him manually to advance the fish in proper synchronism along the trough to the pick-up point, and the increased speed of operation has made the fish much more difficult to control and engage properly with the positioning pins of the bull ring. Nevertheless, since the accuracy and thoroughness of cleaning, and freedom from damage or frequent jams, depends upon the accuracy of the fish's engagement with the positioning pins, even more so than before, it has been found necessary to provide mechanical means to effect advance of the fish along the trough into proper position and in correct synchronism for pick-up by the bull ring, to insure that such pick-up is initiated and completed smoothly and accurately, and to provide means which are automatically self-adapting to handle random and widely varying sizes of fish, without destroying the synchronism between the several parts of the machine.

The provision of means to such ends, operable in correct synchronism with the feed table advancing means and with the bull ring, and self-restoring after most departures from synchronism, is the primary aim of this invention.

Moreover, by the accomplishment of the general object just indicated, a further important object is accomplished, which is to eliminate the necessity of an operator stationed at each such machine, and to permit a single operator to have general charge of several machines, his principal duty being to insure that all are functioning correctly over-all, or to stop any given machine or clear a jam such as may infrequently develop, and restart the machine.

The accommodation of the feed of fish along the trough, and their positioning in proper synchronism for pick-up by the bull ring, yet by means which is automatically self-adjusting to different sizes of fish, is an important object of the invention. Furthermore, since the fish will vary in size, and some may even be so large as to lap a second or following station upon the bull ring, it is an important associated object to provide such feed means as will effect such automatic compensation for variations by as much as from eight to thirty-two inches in the size of individual fish, or up to the point where one fish overlaps two fish-holding stations, without disturbing the synchonous relationship between the feed means and the bull ring, and which in the event of such disturbance of the synchronous relationship as is occasioned by an oversize fish occupying parts of two bull ring stations, will automatically stop the feed, and resume the proper synchonous relationship between the feed means and the bull ring upon resumption of the feed of the next fish under control of the operator.

Moreover, even though a given fish be not so hugely oversize, if it is sufficiently large to disturb the synchonous relationship, it is an object to provide means to restore that relationship automatically immediately such larger fish is delivered to the bull ring, and in that manner to maintain at all times a predetermined synchronous relationship which may momentarily yield to accommodate fish differing from a predetermined average or minimum size, but which is self-restoring to handle such predetermined size or any larger size.

Likewise it is an object to provide means whereby the machine may be adjusted if preferred, to accommodate different average or minimum sizes of fish according to the particular run of variety being handled, or to alter the phase relation of its feed relative to the header table feed, or to the bull ring.

Because of the rotation of the bull ring at a rate sufficiently rapid to handle in excess of one hundred fish a minute, and the necessity of picking up at a given point in the rotation of the bull ring a fish stationed at such pick-up point, and the practical difficulty on the one hand, of proper engagement with the stationary fish as the bull ring passes at high speed, or on the other hand, of permitting frictional engagement of the fish with the bull ring to initiate circumferential movement of the fish prematurely, it is a further object to provide mechanism whereby the fish is stopped at the proper point in its tailward movement, and thereafter is given a correctly timed movement which has a circumferential or tangential component substantially synchronized with the circumferential movement of the bull ring, so that the tail end of the fish moves with the bull ring from the pick-up point onwardly for a distance sufficient to enable at least the first positioning pins to engage properly with the fish.

It is an associated object to provide means which will insure that the fish, after such first engagement with the bull ring, will be drawn and held closely against the periphery of the bull ring for correct engagement of the subsequently engageable positioning pins spaced along the back of the fish.

Because of the rapid movement and abrupt change of direction of the fish as it is picked up by the bull ring, there is sometimes a tendency for the fish to whip about, which would displace it from proper position for engagement before it has been fully engaged, and while it is still supported principally in the trough, and it is a further object to provide means to restrain such movement of the fish, while yet accommodating itself to fish of varying size.

Notwithstanding all safeguards, fish may sometimes pile up, jam, or fail to feed properly through the Iron Chink, or through the feed mechanism, and it is a further object to provide, in association with the feed regulating mechanism, throwout means operable automatically or manually, or both, by which the feeding means may be disconnected from the drive mechanism, and yet may be restored to correct operative and synchronous relationship when the jam has been cleared, without thought or adjustment to the end of such synchronization on the part of the operator.

While the run is on, such machines are operated throughout long shifts by operators who may be unskilled, or who may become tired or inattentive, and at locations where mechanical service is not readily available, yet where a breakdown will result in the spoiling of many fish, and in large economic loss. It is another object to provide mechanism of the nature indicated, which is of simple nature and thoroughly rugged and dependable, so that such breakdowns are unlikely and infrequent.

Many other objects will appear as this specification progresses, but enough has been said to indicate the general nature and objects of the invention.

The present application is a continuation-in-part of my application Serial No. 665,701, filed April 29, 1946, and now abandoned. It includes the general combination and much of the specific structure of that earlier, once copending application, with specifically different phase-restoring mechanism.

The invention herein disclosed and claimed comprises the novel feed regulator for use at the location and in the manner indicated, and the novel subcombinations included therein, all as will appear more fully hereinafter, and as can be determined from the accompanying drawings and in the appended claims which constitute a part of this specification.

The drawings illustrate the principles of the invention embodied in forms which are representative, but which are not intended to be restrictive. No restriction is intended by the present specification and drawings, nor otherwise than as is required by the definitions afforded by the claims.

Figure 2 is a general elevational view, the viewpoint being indicated at 2—2 in Figure 1, and with parts broken away, illustrating the same general arrangement.

Figure 3 is in general an elevation of the feed mechanism, looking endwise toward the trough from the bull ring, the viewpoint being indicated at 3—3 in Figure 2.

Figure 4 is an isometric view, partly diagrammatic, illustrating in particular the gear mechanism which permits yielding when an oversize fish is being fed along the trough.

Figure 5 is in part an elevation and in part a section axially of the gear mechanism illustrated in Figure 4.

Figure 6 is a sectional view transversely of the trough, taken generally along the line indicated at 6—6 in Figure 1.

Figure 7 is a detail sectional view of the resiliently yieldable means incorporated in the feed mechanism, the viewpoint being indicated at 7—7 in Figure 2.

Figure 8 is a sectional view axially of the upright shaft which is part of the feed mechanism, illustrating an optionally usable secondary yielding member, and certain adjusting means in the feed mechanism.

Figure 9 is in part a plan view and in part a section through the same, taken on the line 9—9 of Figure 8, and Figure 10 is a similar view taken along the line 10—10 of Figure 8.

Figure 1:
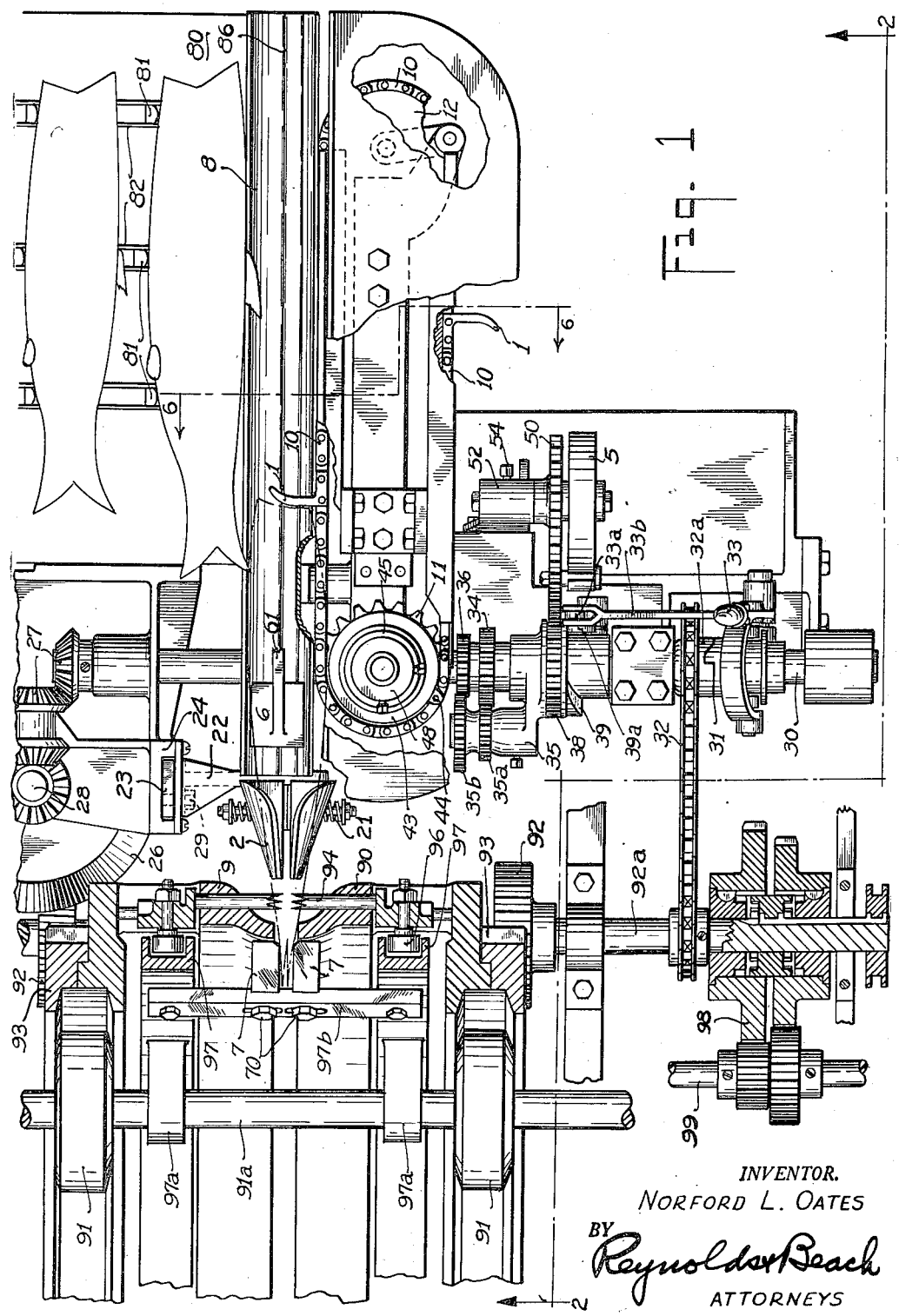
Figure 1 is a general plan view, with parts in section, illustrating in particular the relationship between the header table, the feed trough, the bull ring, and the pick-up point, and the mechanism for synchronizing the several drives.

The well-known Iron Chink fish dressing machine includes a two-part bull ring 9 and 90, mounted for rotation upon supporting rollers 91, and rotatable by means of driving pinions 92 on shaft 92a engaging bull gears 93, which are fast to the two parts of the split bull ring. These two parts of the bull ring are joined for conjoint rotation, and carry cooperating pairs of fish-engaging pins 94 and 95. These pins are controlled by cam followers 96 running in stationary circumferentially slotted cam rings 97 to press the pins together at a pick-up point to pierce the back of a fish and thus to hold the fish to the bull ring, in an attitude tail foremost and belly outward. The fish are thus carried through a circumferential path, where various actions take place, such as finning, splitting, and cleaning out of the entrails. The mechanism for accomplishing these operations has not been shown herein, since it is well-known, and in itself does not concern this invention. Upon completion of the several operations the pins 94 and 95 are withdrawn, and the fish is discharged and carried off. For examples of such fish dressing machines reference is made to patents to Waugh No. 1,542,196, dated June 16, 1925; No. 1,459,273, dated June 19, 1923; No. 1,365,575, dated January 11, 1921; and No. 1,360,064, dated November 23, 1920. In the arrangement shown in Figure 1 the selective clutch and change-speed drive has been suggested at 98, the nature of which or the possible speed variations whereof are immaterial other than to indicate that the drive for the fish dressing machine, and for other mechanism to be described, is obtained from the shaft 99, through the selective change-speed mechanism at 98, to the driven shaft 92a, whereon is mounted the bull ring driving pinions 92. The shaft 91a of the rollers 91 serve as hangers to support the cam rings 97, through brackets 97a, and the two cam rings are connected by transverse bars 97b.

Supported on a bar 97b, or on any other convenient support at the pick-up point, which is represented in Figure 2 by the dot-dash outline of a fish, are two fixedly positioned, spaced-apart fish stops 7. These lie just behind and laterally within the adjacent edges of the two halves 9 and 90 of the bull ring, and they may be adjusted laterally to vary their spacing but they should always be more closely spaced than the two halves of the bull ring, in accordance with the thickness at the tail of the smallest fish being handled. Adjusting bolts 70, which hold the respective fish stops 7 to the bar 97b, permit such adjustment. The purpose of the fish stops 7, of their adjustment, and of the ratchet-like teeth or corrugations 71 on their inside edges, will appear more fully hereinafter.

Before the fish reaches the pick-up point it passes along a feeder table of known type, where each fish is positively engaged, is disposed transversely of the table with its head directed away from the pick-up point, and with its back leading. As the successive fish, at eight-inch spacings, pass along this feeder table, each one is brought into such alignment that the pectoral girdle of each is precisely in line with the pectoral girdle of all preceding fish, and all their pectoral girdles are aligned with a beheading point. As they reach this beheading point, thus aligned, in their passage along the table, each fish is beheaded, and passes promptly thereafter from the feed table for delivery to the pick-up point. For details of the feed table, its drive, and the aligning and beheading operations, reference may be had to some of the patents mentioned above, or to such patents as Waugh No. 1,909,643, issued May 16, 1933; or Oates No. 2,346,935, issued April 19, 1944; or to my own copending application Serial No. 782,865, filed October 29, 1947.

In the present drawings the delivery end only of the feed table 80 is indicated, by means of which table the beheaded fish are delivered, back down and belly up, into the trough 8. The positively driven lugs 81 projecting above their supporting chains 82 which pass about the powered sprocket 83 (see Figure 3) constitute the means by which the fish are positively advanced along the feed table 80. The sprocket wheels 83 are positively driven, by the usual means, including the bevel gears 94, one of which is on an extension of the shaft 92a, and the other of which is on the shaft 85, in synchronism with the remaining mechanism. For further details see certain of the patents mentioned above.

In the past it has been attempted to effect gravity movement of the fish down the trough 8 toward the pick-up point by inclining the trough downwardly toward the pick-up point. This operated wih only fair success, for some fish are more slippery than others, and the dorsal fin, as it tended to raise or to lie flat, created more or less resistance. Usually it was necessary to station an operator at this point to move the fish by hand toward the pick-up point as they drop into the trough. With more recently increased speeds of operation even this has not operated satisfactorily, and so the problem has been to insure proper coordination and synchronism between the fish which must be released by the driving lugs 81 to cause them to arrive at the pick-up point in time to be engaged by the initial positioning pins 94.

As has already been indicated, the problem is more than merely the provision of mechanical means to move the fish down the trough tailward to the pick-up point with sufficient rapidity. The problem is complicated by the necessity for handling random sizes of fish, for in any given run some fish will be large and others will be small, as it has been attempted to indicate in Figure 1. Machine-cleaned fish range from eight to thirty-two inches in length, after beheading. All such fish have previously been aligned for beheading along the line of their pectoral girdles, as is indicated by the two fish which still rest upon the feed table in Figure 1, but each such fish, whether oversize or undersize or average-size, must be moved tailward through a greater or lesser distance, depending upon its size, in time to arrive at the pick-up point, and there to be stopped by the tail stops 7 of the fish-cleaning machine, and thereafter to be firmly grasped in the vicinity of its tail by the closing of the positioning pins 94 carried by the bull ring halves 9 and 90. The time permitted for such tailward movement is brief, and is identical regardless of the size of the individual fish. If the fish is undersize it must move farther, but still must arrive in time. If it is of average size there must be some adjustment of the position of the feed means as between the under-size and the average-size fish; otherwise there is failure of synchronism in the drive means as between the header table and the fish dressing machine. Still further, if the fish is greatly over-size, it may be so long as to overlap a second station on the bull ring, and there must be provision that such an over-size fish, which greatly disturbs the synchronous relationship between the various parts, will not, by itself or in conjunction with a following fish, create a jam in the fish dressing machine. It is to the solution of such problems that the present invention is particularly directed.

Each fish, promptly after it drops into the trough 8, is engaged at its neck, whence the head has been severed, by a pusher element 1, mounted upon a chain 10 and projecting through a slot in the side of the trough. This chain, mounted upon sprocket wheels 11 and 12, is positively driven in such phase relationship to the delivery of fish into the trough by the lugs 81, and to the arrival at the pick-up point of the fish-piercing positioning pins 94 on the bull ring, that each fish will be engaged along the line of severance just behind the pectoral girdle, and will be advanced so that its tail arrives at the pick-up point in advance of the arrival there of the pins 94. Usually the device will be adjusted to handle the minimum size of fish, say eight inches in length after beheading, and the timing will be such that the tail of a fish of that minimum size will arrive between and be stopped by the fish stops 7 just before the pins 94 arrive to engage the fish. It is obvious that the tail of a longer fish, being nearer the pick-up point at the beginning of tailward movement, will arrive sooner at the pick-up point, and must wait there until the pins 94 arrive. The pusher element 1 must halt, in the latter case, until the longer fish moves on, and the mechanism which permits this, and which causes the pusher element to catch up again and to resume its initial phase relationship, will be explained in detail hereinafter. However, as will also appear, the phase relationship is adjustable, if desired, to accommodate fish which are all longer than the minimum length.

The purpose of the lateral adjustment of the tail stops 7 will now be plain. Small fish are not as thick, at their tail, as the large fish, yet the fish's tail should enter between the bull ring halves 9 and 90 to an extent sufficient to engage the pins 94 in the solid flesh, yet not too far forward of the tail. For fish averaging smaller than a run of larger fish, the tail stops 7 would be closely spaced; for larger average fish, they would be separated more widely.

It is quite essential that the fish be stopped in correct position at the pick-up point, and that its tail remain so positioned until the primary positioning pins 94 arrive there. Because the latter are rotating with the bull ring, at a rapid rate, it is highly desirable that the theretofore stopped tail of the fish then move in a generally circumferential direction at a rate which is more or less synchronous with the rotary rate of movement of the pins 94, so that the latter may have time to pin the tail securely while there is no appreciable relative movement between the tail and the pins 94. An abrupt change of direction of the fish, and rapid acceleration of its tail from its momentarily fixed position, are involved. Fish-positioning means are provided at the pick-up point to assist in the attainment of these ends. They may be of either of two forms, or, preferably, both forms are used in conjunction, as will now be explained.

The adjustable fish stops 7 have already been explained. The fish's tail, entering and wedging between the two halves thereof, halts its tailward movement under the influence of the pusher element 1. The fixed stops 7 hold the fish from contact with the rotating bull wheel 9, 90, and the teeth 71 discourage any tendency which might result from incidental friction between the fish and the bull ring halves, for the fish's tail to rise, until the proper time. At that time, the slope of the teeth 71 permits upward movement of the tail without undue effort or restraint.

A tail snubber 2 serves also to position the fish at the pick-up point, but its principal function is to start the circumferential movement of the fish at the proper time and to accelerate that movement sufficiently rapidly, and to such speed, that the fish's tail is substantially immovable relative to the rapidly rotating positioning pins 94 while the latter are penetrating the fish at or near the tail. Thereafter the tail snubber 2 yields to permit the pinned fish to be drawn upwardly by the bull ring and its positioning pins, and to hold the fish close to the bull ring while the successive sets of pins 95 penetrate its back.

This snubber 2, such as has before been stationarily disposed at this location, consists conveniently of two halves cooperating to form what is in the nature of a funnel, two halves being connected together by the gearing 20 for conjoint opening and closing movement, and being urged toward closed position by resilient means indicated at 21. Instead of being stationary, as heretofore, the whole is mounted, preferably for some vertical adjustment, by a bracket 22 upon a vertical slide 23, which is guided at 24 in the frame for vertical movement. A cam follower 25 upon the lower end of the slide 23 is engaged within a rotative channel-like cam 26, to cause abrupt raising of the means 2, and its lowering again, in synchronism with the remainder of the mechanism, and in a manner which will be explained more fully hereinafter. The vertical adjustment permitted at 29 enables close coordination between the snubber 2 and the pins 94.

The fish-positioning means at 7 and at 2 serves, then, three functions: First, the means 7 serves to permit the tail to pass through but stops it in pick-up position, with the tail projecting into the split between the halves of the bull ring, by means of the snubbing action as the stops 7 engage the thicker portion of the fish just ahead of the fish's tail; secondly, by its correctly timed upward movement under the influence of the cam 26 the snubber 2 causes the tail of the fish, so engaged, to rise at the same time and at about the same speed as the circumferential movement of the positioning pins 94, so that these pins are better enabled to engage the fish's tail, which, being so moved, is more or less immovable with respect to the upwardly moving positioning pins; thirdly, by the resilient yielding action and downward return movement of the snubber 2 the remainder of the fish, pulled by the positioning pins 94, is enabled to pass through the funnel, but by it is held to the bull ring, so that its back lies along and within the channel of the bull ring for proper engagement of the successive groups of positioning pins 95.

The drive for the pusher elements 1, as has been indicated, must be automatically yieldable to fish larger than the minimum or the predetermined size for which it is set, yet self-restoring to synchronism; it should be adjustable to accommodate different minimum or predetermined sizes of fish, and it should be so arranged as to stop the mechanism in the event so large a fish is encountered as would be likely to cause a jam or to overlap two fish-receiving stations on the bull ring.

Starting with the shaft 92a, by which the bull ring is driven from the driving shaft 99, a shaft 30 is driven through the clutch means 31 by means of a chain drive 32 about a sprocket wheel 32a loose upon but clutched at 31 to the shaft, or by any similar or suitable arrangement. By throwout of the clutch at 31, which can be accomplished by the hand lever 33, the rotation of the shaft 30 may be stopped. When thus driven the shaft 30 drives a gear 34, which is fast upon the shaft (see Figure 5), and this in turn drives a gear pair 35a and 35b carried upon the end of an arm 35 which is loose upon and capable of rotation about the shaft 30. The gear 35b drives a gear 36, loose upon the shaft, and this, through a bevel gear pair at 37, drives an upright shaft 40.

Secured as a part of the arm 35 is a gear 38, the purpose of which will shortly appear, and throwout cam 39, formed upon this gear 38, cooperates with cam follower 39a, upon the arm 33a, linked by a link 33b to the clutch lever 33, so that the clutch 31 may be thrown out either by the hand lever 33 or through the cam 39 acting through the follower 39a, the arm 33a, and the link 33b.

The shaft 40 is the one whereon the driving sprocket wheel 11 is mounted, and by which the pusher 1 is moved, but the connection between the shaft and sprocket wheel is indirect, and may be yieldable or nonyielding, as the operator chooses. Considering first the nonyielding connection, the sprocket wheel 11 is clamped to a disk 41, loose upon a hub 13 of the sprocket wheel, by means of a clamping bolt 42 projecting through an arcuate slot 12 in the sprocket wheel and threaded within the disk 41. A housing 43 is held fast to the disk 41 by a bolt or pin 44 passing through lugs 41a on disk 41 and 43a on housing 43. By means of a pin 45a projecting from a collar 45 for reception in one of several circularly arranged holes 43b in the housing 43, the housing and collar must rotate together. The collar 45 is keyed to a bushing 46, which is pinned to the shaft 40 by the set screw 46a. Now, since the bushing 46 is fast upon the driving shaft 40, and in turn 45 is keyed to 46, 43 is pinned to 45, 43 is locked to 41, and 41 is clamped to 11, the sprocket wheel 11 is nonyieldingly driven from the shaft 40.

The phase relation between the drive shaft 30 and the pusher 1 may be varied by shifting angularly the sprocket wheel 11 relative to the shaft 40. Such shifting may be resiliently yielding and momentary, as will shortly be explained, or it may be semi-permanent and nonyielding. In the latter case, by withdrawing the pin 45a from its hole 43b, then rotating the sprocket wheel and housing 43 and reengaging pin 45a in a different hole, the phase relationship is changed, but not yieldably. The spring 47 between the collar 45 and a second collar 48—the latter held to the bushing 46 by a set screw 46a— permits such withdrawal of the pin 45a, but retains the latter in any selected hole 43b.

Since yielding and resiliently returnable momentary alteration of the phase relation between the drive shaft 30 and pusher 1 is always desired, one way of accomplishing this is through the spiral spring 4. One end of this spring is fast to the sprocket wheel's hub 13, and its other end is fast to a pin 43c carried by the housing 43. The spring is initially loaded by a pin 49 projecting from the disk 41 into the path of the pin 43c, to limit relaxing movement of this end of the spring. By angularly adjusting the disk 41 and its pin 49 relative to the sprocket wheel 11, the spring loading may be varied; this is the reason for the adjustment at the clamping bolt 42 within the arcuate slot 12. Of course, if the pin 44 remains in engagement with both lugs 41a and 43a, the spring 4 is wholly inactive, regardless of increase or decrease in its loading, so the pin 44 must be removed before a resiliently yielding phase shift can occur at this point. It can and ordinarily does occur at a different point, as will now be made clear.

Meshing with the gear 38, previously described, is a gear segment 50, which is mounted upon a rock shaft 51 for oscillation about the latter's axis; see Figure 7. The connection between the gear segment and the shaft 51, however, is by means of a spiral spring 5, which is so arranged as to tend to hold the gear segment 50 always in a limit position, where, through the gear 38, it urges the arm 35 into a position against a resilient buffer 53. If, however, there is a sufficiently strong tendency for the arm 35 to move in the direction of the dotted arrow shown in Figure 4, as would occur when a long fish is stopped by the positioning means 2 while the pusher 1 still urges it along the trough 8, the gear segment 50 is rotated against the force of the spring 5, but upon removal of the force represented by the dotted arrow in Figure 4, as would occur when the halted fish is engaged and pulled upward by the bull ring and its pins 94 and 95, the spring 5 will return parts to their initial position, the arm 35 will again contact the stop or buffer 53, and the pusher 1, previously momentarily halted, will leap ahead until it resumes its original phase relationship. Thus there is no disturbance of that phase relationship, nor of the synchronism between the header table and bull ring respectively.

If the stoppage is sufficiently long continued, as might occur by reason of a greatly over-size fish, rotation of the arm 35 and of the gear 38 will bring the associated cams 39 into operative relationship to the follower 39a in such manner as to move the clutch elements at 31 in a direction to release the clutch, and when this occurs, the operation of the mechanism ceases until parts are manually restored to operative relationship. This action is intended to occur only when a fish so large as to overlap two stations on the bull ring is fed by this feeder mechanism. When the clutch at 31 is reengaged, the disturbing stress having been removed, parts again and without care to that end automatically are restored to proper phase relationship.

The function of the cam 26 has been described heretofore. It is driven by an extension of the shaft 30, through the bevel gear drive at 27 to the vertical shaft 28, whereon the cam 26 is fast. After disturbance of the phase relationship by yielding at 5, or at 4, or after throw-out by cams 39, resumption of drive through reclutching at 31 to shaft 30 automatically restores the phase relationship to the cam 26, and the latter's synchronism to the bull ring, and hence to all other driven parts, is maintained through the same shaft 30. Always, as the pins 94 of each successive station on the bull ring rise past the pick-up point, the tail-positioning means 2 rises also, and allows time for closing of the pins 94 upon the fish's tail.

The high operating speeds and abrupt change of direction at the pick-up point, coupled with the downwardly pressing action of the snubber as it returns to its lower position, or with the tailward pressure of the pusher 1 on a soft, flabby fish, tend sometimes to flop the fish out of the trough and out of the snubber 2. A spring-biased arm 61, pivoted at 60, carries a plate 6 which overlies the trough 8 somewhat behind the snubber 2, and bears down upon each fish. Without impeding its movement, this hold-down device 6 restrains such flopping of the fish, and permits each fish to rise only as it passes through the snubber 2, close to the bull ring.

The operation should now be clear. Each fish, after beheading, is released by the header table feed means 81, drops into the trough 8, and is promptly and positively shifted tailward until halted by the tail stops 7, assisted by the snubber 2. Its dorsal fin, depending within the channel 86 (see Figure 6) has no tendency to rise and impede the fish's advance. The snubber 2 moves upward, lifting the tail in synchronism with upward movement of the pins 94, until the latter are firmly engaged with the tail. Such engagement continues upward, tailward movement of the fish, dragging it beneath the hold-down 6 and through the snubber so that the successive pins 95 engage it firmly. Thus is the fish moved in correct synchronism from the header table to the fish cleaning machine, and whenever synchronism is disturbed, it is automatically restored, usually without stoppage of the mechanism, but synchronism is also restored automatically in case stoppage occurs under conditions that otherwise would cause a jam. Phase relations are adjustable. The restoring force can be as soft or as stiff and rapidly acting as desired, by simple adjustments. The entire operation is substantially automatic, and an operator to feed each machine is eliminated, yet the operating speed is increased.

I claim as my invention:

1. Mechanism for feeding successive individual beheaded fish of random length in regular phase relationship tailwardly from a deposit point to a pick-up point, after their deposit at regular time intervals at such deposit point by movement transversely of their length, while disposed at regular space intervals in side-by-side relation and with their neck cuts aligned and all at the same side, regardless of the length of the fish, and preparatory to their removal tailwardly at like time intervals and in the same phase relationship, after halting at the pick-up point, even though the fish so halted and removed be of minimum length, which mechanism comprises, in combination: guide means extending from the deposit point to the pick-up point; fish-supporting and guiding means extending between said two points, paralleling the first-mentioned guide means, and shaped to position and guide individual fish for tailward movement between such points; means at the pick-up point, in position to engage the tail portion of a tailwardly-advancing fish, and to halt further advance thereof; pusher means guided on said first-mentioned guide means for advance from the deposit point to the pick-up point, and projecting into the path of fish supported in said fish-supporting means, to engage and positively advance individual fish from the deposit point to the pick-up point; drive means movable in the regular phase relationship and operatively connected to said pusher means to advance the latter thus at a rate sufficiently rapid to clear each successive tailwardly-advancing fish from the deposit point before arrival there, in the regular phase relationship, of the following fish, even though the latter be of maximum length, and to deliver the pushed fish, even though it be of minimum length, to the pick-up point and the fish-halting means there in time to be halted and removed in the regular phase relationship, but to deliver and halt a longer fish there sooner in such regular phase relationship; and resiliently yieldable means operatively interconnecting said pusher means and said drive means, and normally retaining the pusher means in predetermined position relative to the drive means, but yieldable by reaction through the fish, upon earlier halting of the longer fish at the pick-up point, to retard advance of the pusher means relative to the drive means, said resiliently yieldable means being inherently automatically operable upon removal of the longer fish from the pick-up point to restore the retarded pusher means to its regular phase relationship to said drive means.

2. Mechanism for feeding successive individual fish of random length tailwardly in regular phase relationship from a deposit point to a distant pick-up point, after their deposit at regular time intervals at such deposit point, and for removal at like regular time intervals from the pick-up point, which mechanism comprises, in combination: means to support and guide individual fish for tailward movement along a path which includes the deposit point and terminates at the pick-up point; a pusher element projecting into such path in position to engage the neck end of a fish so supported; means to guide said pusher element along that path to advance the so-engaged fish tailwardly along such path; drive means operatively connected to said pusher element, and movable continuously at a rate such as will synchronize arrival of the tail end of a predetermined size of fish at the pick-up point with the initiation of its removal thence; means at the pick-up point positioned to engage the leading tail portion of and to halt a longer fish at the pick-up point prior to initiation of its removal thence, and tending to halt or retard said pusher element by reaction through the pushed fish; and resiliently yieldable means operatively connected between said pusher element and the drive means to retain the pusher element normally in an advanced limit position with respect to the drive means, but yieldable upon such retardation of the pusher element, to permit continued regular advance of the drive means, and by its inherent resilience restoring the retarded pusher element to its normal advanced limit position upon removal of the longer fish from the pick-up point, and consequent removal of the retarding force from said pusher element.

3. The combination of claim 2, wherein the fish's supporting and guiding means is shaped as a trough arranged to receive fish belly-up and tail toward the pick-up point, and wherein the pusher guiding means is located outside of but parallel to the trough.

4. The mechanism of claim 2, characterized in that the drive element for the pusher means includes a primary and a secondary drive means, the pusher element being operatively but non-yieldingly mounted upon said secondary drive means, and the resiliently yieldable means being operatively interconnected between the primary and secondary drive means, but being yieldable upon halting of a longer fish, to retard feed of the secondary drive element and of the pusher means while the primary drive means continues its advance in the regular phase relationship.

5. The mechanism of claim 4, including a second resiliently yieldable means in the secondary drive means operatively interconnected between the pusher element and the first-mentioned yieldable means, and lock-out means for said second resiliently yieldable means, operable at will to leave operative only the first mentioned such means.

6. The mechanism of claim 2, wherein the drive means includes a shaft continuously rotative at a constant speed which corresponds to the regular time intervals for deposit, advance, and pick-up of fish, an arm loose upon said shaft, a driving gear fast upon said shaft alongside said arm, a driven gear loose upon said shaft alongside said driving gear, and operatively connected to the pusher element, paired gears journaled upon said arm and meshing, respectively, with the driving and driven gears for normal transmission therebetween and consequent advance of the pusher element during the regular time interval, and in which mechanism the resiliently yieldable means is connected to said arm to hold the same in a normal fixed position, but is resiliently yieldable to permit movement of the arm away from such position when the pusher element encounters resistance to continued advance of itself and of the driven gear, and is operable by stored resilient force, upon removal of the halted fish and consequently of the pusher-resisting force, to restore the driven gear and the arm to their normal fixed position, and the retarded pusher element to its normal phase relationship to the drive shaft.

7. The mechanism of claim 6, including additionally clutch means incorporated in the drive means in advance of the driving gear, clutch throw-out means normally inoperative, but operatively connected to said clutch means, and means interengageable between said arm and said clutch throw-out means upon occurrence of a predetermined degree of angular departure of the arm from its normal fixed position, to actuate said throw-out means and thereby to discontinue drive to the pusher element.

8. The mechanism of claim 2, wherein the drive means is formed in two parts, and means joining the two parts thereof positively but for adjustment to advance or retract the pusher element in its phase relationship to the drive means, and to the times of deposit and pick-up of the fish.

9. The mechanism of claim 2, wherein removal of the fish from the pick-up point is accomplished by movement of the tail end of a fish positioned there upwardly at an abrupt angle to the direction of the length of such fish, such mechanism including further, means guided for movement generally parallel to the direction of removal of the fish's tail end, and positioned to engage and lift the same, and means operatively connected to the drive means and synchronized to raise said lifting means substantially simultaneously with initiation of removal of the fish's tail end.

10. The mechanism of claim 9, wherein the fish-halting means is guided for upward movement and constitutes also the fish-lifting means.

11. Mechanism for feeding successive individual beheaded fish of random length in regular phase relationship first transversely of their length, while disposed at regularly spaced intervals in side-by-side relation, and with their neck cuts all at the same side and in alignment, to a deposit point, then tailwardly in time to clear the following fish even though the latter be of maximum length, to a pick-up point in time to be there engaged and halted, and subsequently to remove the same tailwardly at regular intervals, even though it be of minimum length, which mechanism comprises, in combination: a header table; means to advance beheaded fish initially along said header table in a direction transversely of their length, at definite space intervals and corresponding time intervals, while disposed side-by-side and with their aligned neck cuts all at the same side; means at a deposit point located at the terminus of said header table to receive and support each such fish, and to guide the same for tailward movement to a distant pick-up point; pusher means and guide means therefor guiding the pusher means in a path to engage the pusher means with the neck cut of each such deposited fish, and for advance of the pusher means and the so-engaged fish tailwardly to the pick-up point; means located at the pick-up point in position to engage the tail portion of a tailwardly-fed fish, and to halt the same; fish-removing means guided for movement in a definite path which includes the pick-up point, and including means to engage said fish-removing means with the so-halted fish and to remove the same in regular phase relationship at time intervals corresponding to the time intervals of the fish's feed along the header table; drive means synchronized in regular phase relationship with each of the initial advancing means and the removing means, respectively, operatively connected to said pusher means to advance the latter along the aforementioned path at a rate sufficiently rapid to clear the pushed fish from the deposit point in advance of the deposit there of the following fish, even though the latter be of maximum length, and to deliver a pushed fish of minimum length to the pick-up point not later than the arrival there of its engaging and removing means, and consequently at a rate sufficiently rapid to deliver a longer fish to the halting means prior to such arrival of its engaging and removing means; and resiliently yieldable means operatively interconnecting said pusher means and its drive means, yieldable upon early halting of the longer fish to retard advance of the pusher means, and by its resilience restoring the pusher means automatically to operative position and proper phase relationship relative to its drive means upon removal of such longer fish by said fish-removing means from the pick-up point.

12. The combination of claim 11, including also fish-snubbing means disposed in the path of the tailward movement of the fish, adjacent the path of the fish-removing means, and shaped as a funnel to embrace the fish as it moves beyond the pick-up point, and to urge the same throughout its length, as it is drawn through the funnel, closely to the path of the fish-removing means, for further engagement by the latter.

13. The mechanism of claim 11, including movement-initiating means guided for movement in a path generally parallel to the path of the fish-engaging and removing means, and located adjacent such path at the pick-up point, in position to engage the tail portion of a fish halted there; and means operatively connected to the drive means and, synchronized with said fish-removing means, to shift said movement-initiating means and the thereby-engaged tail portion of the fish in a path generally parallel to the path of the fish-removing means and at a rate corresponding to the latter's rate, during the initial movement of the fish when engaged by the latter.

14. The combination of claim 11, including means engageable with the tail of a fish which has been presented in position for engagement by the fish-engaging means of the fish-cleaning machine, means guiding the same for movement in a path alongside the path of said fish-engaging means, and means so to move the same during initial engagement of the fish by said fish-engaging means.

15. The combination of claim 11, including means incorporated in the pusher-driving means, adjustable to advance or retract the phase relationship of the engagement of the pusher with the fish, without disturbance of the general synchronous relationship of the fish-advancing means of the header table and the fish-removing means, respectively.

16. A support positioned at the terminus of a header table to receive successive fish deposited thereon at regular time intervals from such header table, and extending thence to a distant pick-up point to deliver each in turn at like time intervals by lengthwise movement at such pick-up point; means movable along said support to advance a fish from its point of deposit to the pick-up point; a fish-dressing machine including fish-engaging elements guided for movement through such pick-up point in a path at an abrupt angle to the fish's lengthwise advance; means at the pick-up point normally located in the path of a fish moving lengthwise in such path to halt and position such lengthwise-moving fish with its theretofore leading portion in position for pick-up by the next-arriving fish-engaging elements; means guiding said fish-positioning means for movement in a path paralleling the path of said fish-engaging elements; and drive means operatively connected to each of the fish-advancing means, the fish-positioning means, and the fish-dressing machine, to move the fish-positioning means and the fish halted thereby, and the fish-engaging elements, each in its path and in the same general directional sense, at approximately the same speed, during initial engagement of the fish by the fish-engaging elements of the fish-dressing machine.

17. The combination of claim 16, wherein the fish-positioning means includes a funnel formed in plural parts, and open for entrance of the leading end of a fish as it reaches the pick-up point, and resilient means constricting the plural parts but yieldable for expansion of said funnel as the fish is pulled therethrough by its engagement by the fish-engaging elements of the fish-dressing machine, said funnel being the element which is movable synchronously with said fish-engaging elements.

18. In a fish-cleaning machine, a rotative bull ring and fish-engaging elements spaced along the periphery thereof at regular space intervals, a feed regulator comprising a pusher element engageable behind a fish and guided to advance such fish lengthwise from a distant point into proximity to and into position to be engaged and picked up by the bull ring and its fish-engaging elements, common drive means for said pusher element and for the bull ring arranged to synchronize arrival of a predetermined size of fish at the pick-up point with the arrival there of the corresponding fish-engaging elements of the bull ring, means positioned in the path of the advancing end of a fish to engage and halt it at the pick-up point, if it is larger than such predetermined size, and means reacting between said pusher element and its drive means, resiliently yieldable by stoppage of such larger fish and consequently of its pusher element.

19. In a fish-cleaning machine, a rotative bull ring and fish-engaging elements spaced along the periphery thereof at regular intervals, a feed regulator comprising a pusher element engageable behind a fish and guided to advance such fish lengthwise along a predetermined path to a pick-up point and into position with relation to the bull ring and its fish-engaging elements such that it will be engaged and picked up by the latter upon arrival at the pick-up point, drive means for said pusher element and for the bull ring arranged to synchronize arrival of a predetermined size of fish at the pick-up point with the arrival there of the corresponding fish-engaging elements of the bull ring, means incorporated in said drive means and resiliently yieldable by stoppage of said pusher element, as by arrival of a larger fish at the pick-up point in advance of the arrival there of the fish-engaging elements, to alter the phase relation of the pusher element to the fish-engaging elements of the bull ring, said resiliently yieldable means reacting upon said pusher element upon subsequent pick-up and removal of such halted larger fish to restore the pusher element to its normal phase relation to the fish-engaging elements of the bull ring.

20. In a fish-cleaning machine, a rotatively advancing bull ring and fish-engaging elements spaced therealong and movable therewith through a path which includes a pick-up point, there to engage and remove a fish, means to support and guide individual fish successively to such pick-up point along a path converging with the path of the fish-engaging elements of the bull ring, a pusher element engageable with a fish so supported to advance it lengthwise towards the bull ring into pick-up position at the pick-up point, drive means for said bull ring and for said pusher element arranged to generally synchronize arrival of a fish at the pick-up point with the arrival there of the corresponding fish-engaging elements of the bull ring, means at the pick-up point normally positioned to engage a fish located there, means guiding said latter means for movement in a path generally paralleling that of the fish-engaging means of the bull ring, and means synchronized with the drive means and operatively connected to said fish-engaging means at the pick-up point to initiate and continue movement of the latter means and of a fish there presented, in the same sense, and at substantially the same rate of movement, as the bull ring's movement, during and for a sufficient time to enable secure initial engagement of the fish-engaging elements with such fish.

21. A feed regulator for fish-cleaning machines, comprising a pusher element guided for movement and movable in a path from a deposit point, to engage the trailing portion of a fish located there, to a pick-up point, to advance the so-engaged fish lengthwise into a pick-up position at the pick-up point, means at the pick-up point positioned in the path of such a fish to engage the leading portion thereof and to halt the advance of such fish in such pick-up position, and drive means operatively connected to said pusher element including means yieldable upon halting of the fish.

22. In combination with a trough shaped to receive and guide individual fish for movement in the direction of its length, wherein successive individual fish are deposited, each with its tail in the same direction, a pusher element, means supporting said pusher element projecting within said trough in position to engage a fish received therein, and guiding the pusher element along the trough, for advance of each fish so engaged in the tailward direction to a pick-up point distant from the point of engagement with the fish, means at the pick-up point positioned in the path of a so-advanced fish to engage the leading tail portion thereof and to halt fish of length greater than a predetermined minimum length, drive means operatively connected to the pusher means to move the latter along the trough, and means incorporated in said drive means and resiliently yieldable upon such halting to relieve the fish of appreciable further tailward urging.

23. In a fish-cleaning machine, a rotatively advancing bull ring and fish-engaging elements spaced along its periphery at regular intervals, and operable to engage and remove a fish positioned at a definite pick-up point which is located adjacent the bull ring's periphery, at regular time intervals, means to support and guide individual fish for tailward movement along a path which terminates in such pick-up point, a pusher element projecting into such path to engage behind the neck end of a fish so supported, means to guide said pusher for movement along that path to advance the so-engaged fish tailwardly along such path, drive means operatively connected to said bull ring and to said pusher element, movable continuously at a rate such as will synchronize arrival of the tail end of a predetermined size of fish at the pick-up point with the arrival there of corresponding fish-engaging elements of the bull ring, means at the pick-up point positioned to engage the leading tail portion of and to halt a longer fish at the pick-up point prior to arrival there of the corresponding fish-engaging means, and tending to halt or retard said pusher element by reaction through the pushed fish, said drive means including a shaft operatively connected to and continuously rotated in synchronism with the bull ring, an arm loose upon said shaft, a driving gear fast upon said shaft alongside said arm, a driven gear loose upon said shaft alongside said driving gear, and operatively connected to said pusher element, paired gears journaled upon said arm and meshing, respectively, with the driving and driven gears for normal transmission therebetween, and resiliently yieldable means connected to said arm to hold the same normally stationary, but resiliently yileable to permit movement of said arm upon encountering resistance to advance of said pusher element and the driven gear, and operable by stored resilient force, upon removal of the halted fish and consequently of the pusher-resisting force, to restore the arm to its normal position, and the retarded pusher element to its normal synchronous relationship in the drive means.

24. A feed regulator as in claim 23, including clutch means incorporated in the drive means in advance of said driving gear, and clutch throw-out means normally inoperative but operatively connected to said arm to be operated by a predetermined degree of angular departure of the arm from its normal position, to discontinue drive to said pusher element.

25. A feed regulator as in claim 23, the means to hold said arm stationary including a gear pinion operatively connected to said arm to rotate therewith, a gear meshing with said pinion, spring means, constituting the resiliently yieldable means, operatively connected to said gear and yieldingly holding the same and said arm in a normal position, but yieldable to permit rotation of said arm about said shaft under the influence of stoppage of said pusher element, and reacting to restore parts to their normal relationship following departure therefrom and after removal of the disturbing force.

26. In combination with a fish-cleaning machine including an advancing bull ring or the like and fish-engaging elements spaced therealong, and advancing therewith along a definite path which includes a pick-up point, means to guide a fish for advance in the direction of its length, and generally at an angle to the direction of advance of the bull ring, to dispose its leading portion at such pick-up point and in position for engagement by the fish-engaging elements of the bull ring, as they pass such pick-up point, means normally located at the pick-up point, in position to engage the fish there located, independent of but movable in synchronization with the bull ring, and means operatively interconnecting the bull ring and said latter means for moving at least that portion of the fish which is disposed for engagement by said fish-engaging elements of the bull ring, alongside and at a rate corresponding to the rate of advance of the bull ring, during the period that such fish-engaging elements are passing and engage a fish located at the pick-up point.

27. In combination with a fish-cleaning machine including a rotative bull ring and fish-engaging elements spaced about its periphery, means to guide a fish for tailward movement in a path generally radially inwardly towards the periphery of the bull ring into a pick-up position, for engagement of the fish-engaging elements with its caudal portion, means independent of the fish-cleaning machine, engageable with the caudal portion of a fish thus disposed, and guided for limited movement transversely of the fish and alongside the bull ring's periphery, and drive means synchronized with the bull ring and operatively connected to said caudal-portion-engaging means so to move the latter and the engaged fish's caudal portion at substantially the same rate as the bull ring's periphery, as the bull ring's fish-engaging elements reach and are being engaged with the fish's caudal portion.

28. The combination of claim 27, including means to adjust the initial position of the caudal-portion-engaging means peripherally relative to the bull ring.

29. In combination, a feeder table and fish-feeding elements spaced apart at regular intervals and guided for movement along said table to feed individual fish, while disposed transversely of the table, to a delivery point at one end of the table; a fish-dressing machine and fish-engaging elements thereon movable in a fixed path past a pick-up point which is offset from the delivery point, in a direction lengthwise of a fish located at such latter point, by a distance in excess of the length of a fish of maximum size, said fish-engaging elements being spaced apart at regular intervals in the direction of their movement; fish-advancing means normally spaced at regular intervals which correspond to the intervals of the fish-feeding elements and of the fish-engaging elements; means guiding the fish-advancing means for movement in a path from the delivery point to the pick-up point, thus to engage behind and advance individual fish; drive means movable at a regular rate, and common to the fish-feeding elements of the table, the fish-engaging elements of the fish-dressing machine, and said fish-advancing means, organized and arranged to advance the latter in a normal phase relation past the delivery point to engage and advance each fish of a selected minimum length or longer, which is delivered there from the header table by its fish-feeding elements at regular time intervals, to arrive with its leading portion at the pick-up point not later than the arrival there of corresponding fish-engaging elements of the fish-dressing machine; means at the pick-up point positioned to engage and halt a longer fish arriving earlier in the phase; and means interposed between the fish-advancing means and the common drive means, normally active to hold the fish-advancing means in an advanced limit position, but resiliently yieldable upon such earlier halting of a longer fish and the consequent halting of its fish-advancing means, to displace the fish-advancing means rearwardly from its advanced limit position, and thereby to alter the phase relation of the so-halted fish-advancing means to the drive means, and operable automatically upon engagement by the fish-engaging means and consequent removal of the halted fish, to restore the halted fish-advancing means to its advanced limit position, in normal phase relation to the drive means.

30. The combination of claim 29, including means independent of the fish-dressing machine and located at the pick-up point to engage preliminarily that portion of each fish which is to be subsequently engaged by the fish-engaging elements of the fish-dressing machine while such fish is halted at the pick-up point; drive means therefor, synchronized with the common drive means, to move said preliminary fish-engaging means and the portion of the fish engaged thereby, at a rate approximating that of the fish-dressing machine's engaging means, during initial engagement of the latter with the fish; and guide means for said preliminary fish-engaging means to confine its movement to a path paralleling that of the fish-dressing machine's engaging means.

31. Mechanism for advancing individual fish of random size generally horizontally tailward from a deposit point, such as the terminus of a header table to a pick-up point preliminary to its upward advance, under the influence of means such as the fish-engaging means of a fish dressing machine, said mechanism comprising: a support for each individual fish located intermediate the header table terminus and the pick-up point; means individual to and positioned to engage with each fish while so supported, guided for movement and movable in a path between the deposit point and the pick-up point, so to advance the fish; fish-halting means at the pick-up point positioned in the fish's path of advance to engage and halt a fish so advanced; drive means synchronized with the header table and with the oncoming fish-engaging means of the fish-dressing machine, and controlling advance of each fish-advancing means to effect arrival of each fish which is in excess of a predetermined length at the pick-up point, there to be engaged and halted by said halting means, not later than the instant of arrival at the pick-up point of the fish-engaging means of the fish-dressing machine; and resiliently yieldable means incorporated in said drive means, normally retaining the fish-advancing means in a forward limit position relative to the drive means, but yieldable relative to said drive means upon halting of a longer fish and its advancing means, and operable to advance the so-halted fish-advancing means back to its synchronous relationship to the drive means after removal of the halting force.

NORFORD L. OATES.

REFERENCES CITED

The following references are of record in the file of this patent:

UNITED STATES PATENTS

| Number | Name | Date |
| --- | --- | --- |
| 1,459,273 | Waugh | June 19, 1923 |
| 1,653,906 | Henbocket et al. | Dec. 27, 1927 |